(12) United States Patent
Semura et al.

(10) Patent No.: US 9,033,124 B2
(45) Date of Patent: May 19, 2015

(54) DAMPER DEVICE FOR ROTATING MACHINE

(75) Inventors: Junichi Semura, Kariya (JP); Shigeru Kawano, Chiryu (JP); Masashi Higashiyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 158 days.

(21) Appl. No.: 13/615,831

(22) Filed: Sep. 14, 2012

(65) Prior Publication Data

US 2013/0075209 A1 Mar. 28, 2013

(30) Foreign Application Priority Data

Sep. 25, 2011 (JP) ................................ 2011-208321

(51) Int. Cl.
| | | |
|---|---|---|
| F16F 15/14 | (2006.01) | |
| F16F 7/104 | (2006.01) | |
| F04C 29/00 | (2006.01) | |
| F16F 7/108 | (2006.01) | |
| F04C 23/00 | (2006.01) | |
| F04C 18/02 | (2006.01) | |

(52) U.S. Cl.
CPC ............ F16F 7/104 (2013.01); *F16F 15/1414* (2013.01); *F16F 7/108* (2013.01); *F16F 15/1435* (2013.01); *F04C 23/008* (2013.01); *F04C 29/0021* (2013.01); *F04C 18/0215* (2013.01); *F04C 2270/125* (2013.01)

(58) Field of Classification Search
CPC ........... F16F 7/104; F16F 7/108; F16F 7/112; F16F 7/116; F16F 15/1414; F16F 15/1435
USPC ........... 188/378, 379, 380; 267/140.12, 141.2
See application file for complete search history.

(56) References Cited

U.S. PATENT DOCUMENTS

| | | | | |
|---|---|---|---|---|
| 4,325,133 | A * | 4/1982 | Reitmayer | 369/263.1 |
| 4,475,184 | A * | 10/1984 | Cooper et al. | 369/263.1 |
| 4,736,701 | A * | 4/1988 | Kondo et al. | 114/340 |
| 6,217,297 | B1 | 4/2001 | Tsumagari et al. | |
| 6,286,782 | B1 * | 9/2001 | Bansemir et al. | 244/17.11 |
| 7,438,165 | B2 * | 10/2008 | Nerubenko | 188/380 |
| 8,091,450 | B2 * | 1/2012 | Manzoor et al. | 74/574.4 |
| 8,117,943 | B2 * | 2/2012 | Manzoor | 74/574.4 |
| 2007/0215423 | A1 * | 9/2007 | Staley et al. | 188/379 |
| 2009/0078078 | A1 * | 3/2009 | Manzoor | 74/574.4 |

(Continued)

FOREIGN PATENT DOCUMENTS

| | | | | |
|---|---|---|---|---|
| DE | 102008058470 B4 * | 9/2010 | | F16F 15/08 |
| DE | 102011001174 A1 * | 9/2012 | | F16F 15/136 |
| JP | H02-221687 A | 9/1990 | | |

(Continued)

OTHER PUBLICATIONS

Office Action mailed Sep. 3, 2013 in the corresponding JP application No. 2011-208321 (English translation).

(Continued)

*Primary Examiner* — Thomas Irvin
(74) *Attorney, Agent, or Firm* — Posz Law Group, PLC (57) ABSTRACT

A damper device is coaxial with a central axis of an electric compressor. The damper device includes a base portion and first and second weight portions. The base portion is configured to be fixed to a casing of the electric compressor. The first and second weight portions are oscillatable relative to the base portion.

15 Claims, 8 Drawing Sheets

(56) References Cited

U.S. PATENT DOCUMENTS

| | | | |
|---|---|---|---|
| 2009/0078079 A1* | 3/2009 | Manzoor et al. | 74/574.4 |
| 2010/0106335 A1* | 4/2010 | Steyer et al. | 700/280 |

FOREIGN PATENT DOCUMENTS

| | | |
|---|---|---|
| JP | H03-271593 A | 3/1991 |
| JP | A-H03-271596 | 12/1991 |
| JP | 05-052237 A | 3/1993 |
| JP | 2006-291996 A | 10/2006 |
| JP | A-2010-124591 | 6/2010 |

OTHER PUBLICATIONS

Office Action mailed Nov. 19, 2013 in the corresponding JP application No. 2011-208321 (and English translation).

* cited by examiner

DAMPER DEVICE FOR ROTATING MACHINE

CROSS REFERENCE TO RELATED APPLICATION

This application is based on and incorporates herein by reference Japanese Patent Application No. 2011-208321 filed on Sep. 25, 2011.

TECHNICAL FIELD

The present disclosure relates to a damper device for a rotating machine.

BACKGROUND

JP2008-138685A (corresponding to U.S. Pat. No. 6,217,297B1) teaches an electric compressor, which is installable to a vehicle. This electric compressor is configured to be installed to a lateral surface of an internal combustion engine of the vehicle such that the electric compressor projects from the engine. The electric compressor is a rotating machine, which includes rotatable bodies, such as a rotor of an electric motor unit and a rotatable shaft of a compressor unit. As indicated in JP2008-138685A (corresponding to U.S. Pat. No. 6,217,297B1), the vibrations of the rotating machine are limited by improving a fixing structure of the rotating machine.

On the other hand, there is known a damper device, which is configured to oscillate to cancel vibrations (oscillations) of the rotating machine. For example, JPH03-271596A teaches a motion damper, which is installed in an inside of a rotary compressor. This motion damper includes an inertial body and a connecting body, and the connecting body connects between the inertial body and a case of the compressor.

Furthermore, JP2010-124591A teaches dampers installed in an inside of a dynamo-electric machine. Each damper includes a weight portion (serving as an inertial body) and a resilient member. The resilient member connects between the weight portion and a laminated iron core and is resiliently deformable in the radial direction. JP2010-124591A discloses the structure, which has the multiple dampers to damp the oscillations of multiple oscillation modes.

The damper device of JPH03-271596A cannot limit complicated oscillations generated in the rotating machine.

JP2010-124591A proposes to limit the complicated oscillations with the multiple dampers. However, in the prior art technique, the two dampers are installed in the rotating machine such that the two dampers are spaced from each other. In this structure, it is required to provide the installation locations, which are spaced from each other and to which the dampers are installed. Also, the number of steps, which are required to install the dampers, is disadvantageously increased.

Furthermore, in the prior art technique, the dampers are arranged to project radially outward of the rotating machine or to project axially outward of the rotating machine. With this kind of structure, the installation of the dampers in the inside of the rotating machine is difficult. Furthermore, the size of the rotating machine is disadvantageously increased.

SUMMARY

The present disclosure is made in view of the above disadvantages. According to the present disclosure, there is provided a damper device for a rotating machine, which includes a rotatable arrangement that is rotatable about a central axis. The damper device includes a base portion, a first inertial body, a second inertial body, at least one primary connecting member and at least one secondary connecting member. The base portion is configured to be fixed to a casing of the rotating machine. The first inertial body is movable relative to the base portion. The second inertial body is movable relative to the base portion. The at least one primary connecting member connects between the base portion and the first inertial body and enables oscillation of the first inertial body in a first direction that is perpendicular to the central axis. The at least one secondary connecting member connects between the base portion and the second inertial body and enables oscillation of the second inertial body in a second direction that is perpendicular to the central axis and is different from the first direction.

BRIEF DESCRIPTION OF THE DRAWINGS

The drawings described herein are for illustration purposes only and are not intended to limit the scope of the present disclosure in any way.

DETAILED DESCRIPTION

Various embodiments of the present disclosure will be described with reference to the accompanying drawings. In the following embodiments, similar components are indicated by the same reference numerals and will not be redundantly described for the sake of simplicity. In each of the following embodiments, if only a part of a structure is described, the remaining part is the same as that of the previously described embodiment(s). Furthermore, in the second and subsequent embodiments, a part of the structure, which corresponds to the one discussed in the previous embodiment, will be indicated by a corresponding reference numeral that differs only with respect to the hundred's digit and will not be redundantly described for the sake of simplicity. In each of the following embodiments, besides the explicitly described combination(s) of the components, it should be noted that any one or more of the components of any one of the following embodiments can be combined with any one or more of the components of the any other one or more of the embodiments.

(First Embodiment)

Figure 1:
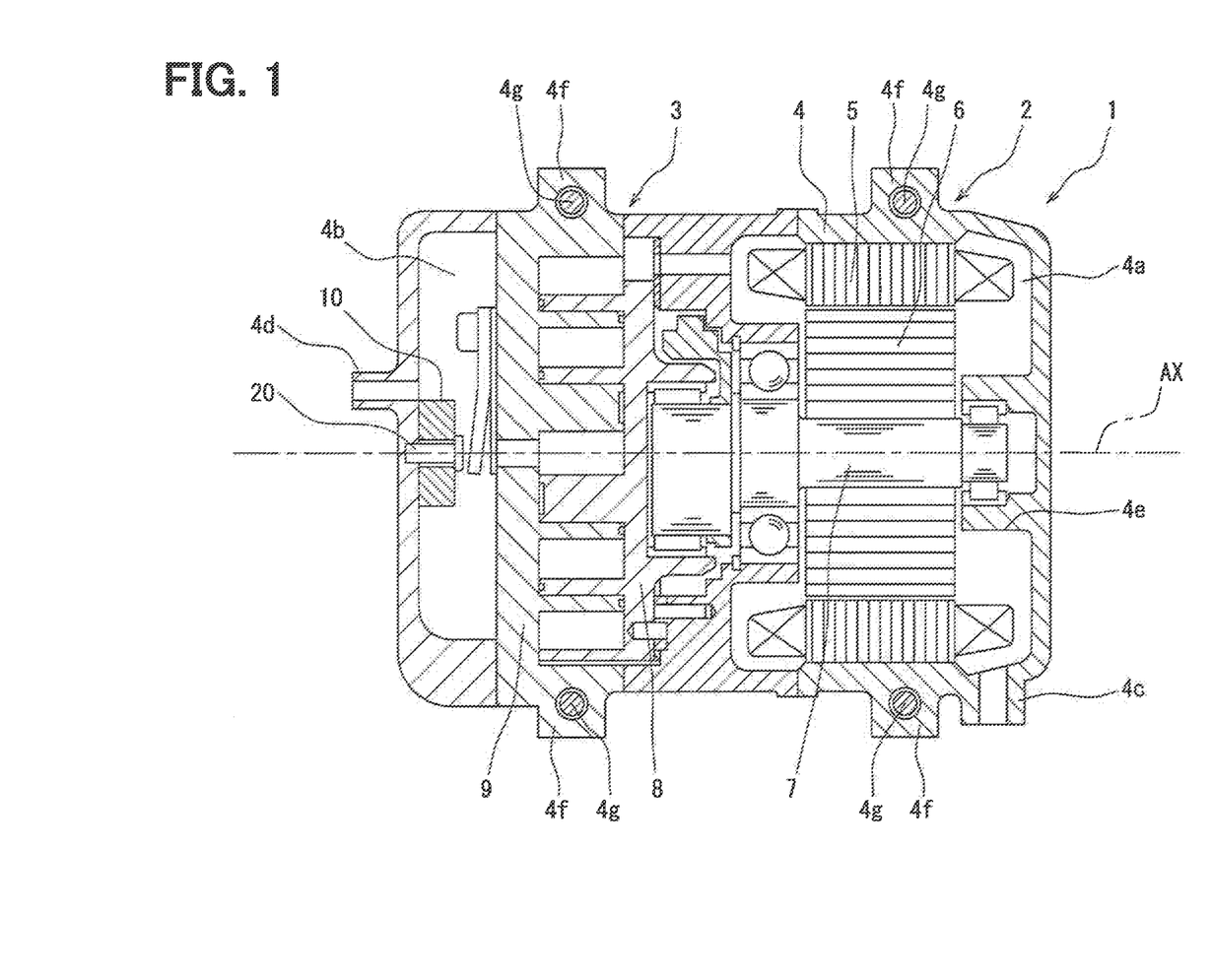
FIG. 1 is a longitudinal cross-sectional view of an electric compressor according to a first embodiment of the present disclosure.

FIG. 1 is a longitudinal cross-sectional view of an electric compressor according to the first embodiment of the present disclosure. Specifically, FIG. 1 shows the longitudinal cross section taken along a central axis Ax, i.e., a rotational axis of the electric compressor 1. The electric compressor 1 serves as a rotating machine of the present embodiment. The electric compressor 1 is used in a refrigeration cycle of a vehicle (e.g., an automobile). The electric compressor 1 is installed in the vehicle. The electric compressor 1 is fixed to a vehicle body of the vehicle or an internal combustion engine of the vehicle.

The electric compressor 1 has a rotatable arrangement, which includes an electric motor unit 2 and a compressor unit 3 and is rotatable about the central axis AX. The motor unit 2 and the compressor unit 3 are received in a common casing 4. The casing 4 is made of a plurality of members. The casing 4 includes the members, which belong to the motor unit 2, and the members, which belong to the compressor unit 3. The casing 4 defines chambers, which receive the corresponding components, and flow passages, through which refrigerant (fluid) flows. The casing 4 defines, for example, a motor chamber 4a, which receives the components of the motor unit 2. The casing 4 defines the motor chamber 4a by a cylindrical portion of the casing 4, which is coaxial with the central axis AX of the electric compressor 1. Therefore, the motor chamber 4a is coaxial with the central axis AX. The casing 4 defines, for example, a discharge chamber 4b, into which the refrigerant compressed by the compressor unit 3 is supplied. The casing 4 defines the discharge chamber 4b by a cylindrical portion of the casing 4, which is coaxial with the central axis AX of the electric compressor 1. Therefore, the discharge chamber 4b is coaxial with the central axis AX.

The motor unit 2 includes a stator 5 and a rotor 6. The stator 5 is fixed to the casing 4. The rotor 6 is fixed to a rotatable shaft 7, which is rotatably supported by the casing 4. A rotational axis of the rotatable shaft 7 coincides with the central axis AX of the electric compressor 1.

The compressor unit 3 is a displacement compressor. The compressor unit 3 is implemented by a scroll compressor. The compressor unit 3 includes a movable scroll member 8 and a stationary scroll member 9. The movable scroll member 8 is meshed with an eccentric portion of the rotatable shaft 7. The movable scroll member 8 is rotated synchronously with the rotatable shaft 7. A working chamber is defined between the movable scroll member 8 and the stationary scroll member 9. When the movable scroll member 8 is rotated, a volume of the working chamber is changed, and thereby the refrigerant is compressed. The refrigerant is drawn from the refrigeration cycle into the casing 4 through a suction port 4c and is then drawn into the compressor unit 3 through the motor chamber 4a. The refrigerant is discharged from the compressor unit 3 into the discharge chamber 4b. Then, the refrigerant is supplied from discharge chamber 4b to the refrigeration cycle through a discharge port 4d. The casing 4 includes a boss portion 4e, which is configured into a cylinder form or a cylindrical tubular form. The boss portion 4e receives a bearing, which rotatably supports the rotatable shaft 7. The casing 4 has a plurality of fixing portions 4f, through which the electric compressor 1 is fixed. Each fixing portion 4f has a bolt hole, through which a bolt 4g is received. The fixing portions 4f enable fixation of the electric compressor 1 in a direction perpendicular to the central axis AX.

In a fixed state where the electric compressor 1 is fixed by the fixing portions 4f and the bolts 4g, there is formed an oscillation system (a vibration system) with one degree of freedom where the electric compressor 1 serves as a mass, and the bolts 4g serve as spring elements and damper elements. Therefore, noises are generated by the oscillation (vibration) of the electric compressor 1 and resonance of the oscillation system (vibration system).

The electric compressor 1 has a damper device 10, which limits the oscillation (vibration). The damper device 10 limits generation of the noises by limiting the resonance of the oscillation system, which includes the electric compressor 1. The damper device 10 is received in the inside of the electric compressor 1. The damper device 10 is fixed to the casing 4. The damper device 10 is received in the discharge chamber 4b. The damper device 10 is fixed to an inner surface of the casing 4 by a bolt 20. The damper device 10 is configured into a plate form or an annular form, which is thin in a direction of the central axis AX of the electric compressor 1 and extends in a radial direction of the electric compfdressor 1. The thickness of the damper device 10 is thinner than that of at least one of the motor unit 2 and the compressor unit 3. A maximum diameter of the damper device 10 is smaller than a diameter of the stator 5. A maximum diameter of the damper device 10 is smaller than a diameter of the rotor 6. The maximum diameter of the damper device 10 is smaller than the diameter of the stationary scroll member 9. The maximum diameter of the damper device 10 is smaller than the diameter of the movable scroll member 8.

Figure 2:
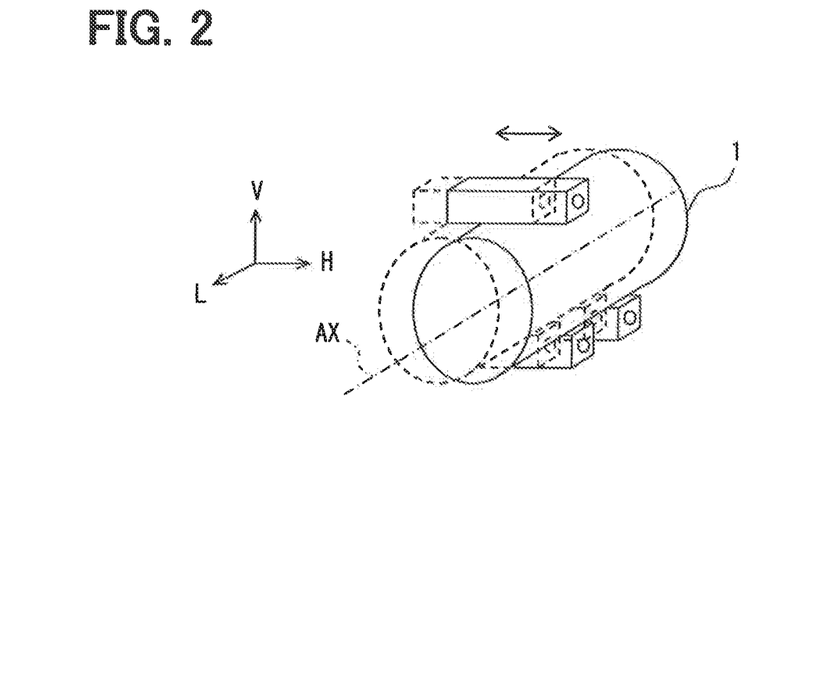
FIG. 2 is a perspective view showing one oscillation mode of the electric compressor of the first embodiment.
Figure 3:
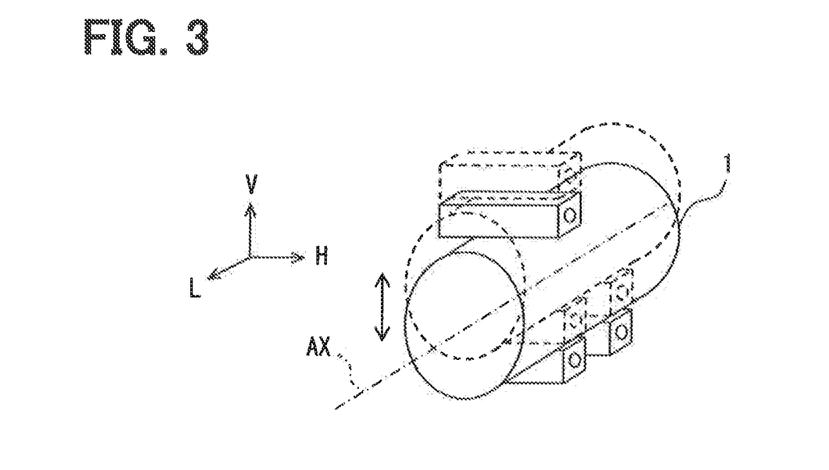
FIG. 3 is a perspective view showing another oscillation mode of the electric compressor of the first embodiment.

FIG. 2 indicates one oscillation mode of the electric compressor 1 in one translation direction according to the first embodiment. FIG. 3 indicates another oscillation mode of the electric compressor 1 in another translation direction according to the first embodiment. In FIGS. 2 and 3, an axis V, an axis H and an axis L indicate an orthogonal coordinate system in the state where the electric compressor 1 is installed in the vehicle. The axis V corresponds to a vertical direction or a top-to-bottom direction. The axis H corresponds to horizontal direction or a left-to-right direction. The axis L corresponds to a front-to-back direction or a longitudinal direction of the central axis AX.

The resonance modes of the electric compressor 1 include three translation directions and three rotational directions. The three translation directions of the electric compressor 1 include a translation direction of a left-to-right translation of the electric compressor 1, a translation direction of top-to-bottom translation of the electric compressor 1 and a translation direction of front-to-back translation of the electric compressor 1. The three rotational directions of the electric compressor 1 include a rotational direction of rotation of the electric compressor 1 about a left-to-right axis, a rotational direction of rotation of the electric compressor 1 about a top-to-bottom axis and a rotational direction of rotation of the electric compressor 1 about a front-to-back axis. However, in the electric compressor 1, the oscillations of the electric compressor 1 are particularly large in the two translation directions in a plane that is perpendicular to the rotatable shaft 7. One of these two translation directions is the direction of the axis H shown in FIG. 2. The other one of these two translation directions is the direction of the axis V shown in FIG. 3. In these examples, the electric compressor 1 is fixed such that the central axis AX extends in the horizontal direction.

Figure 4:
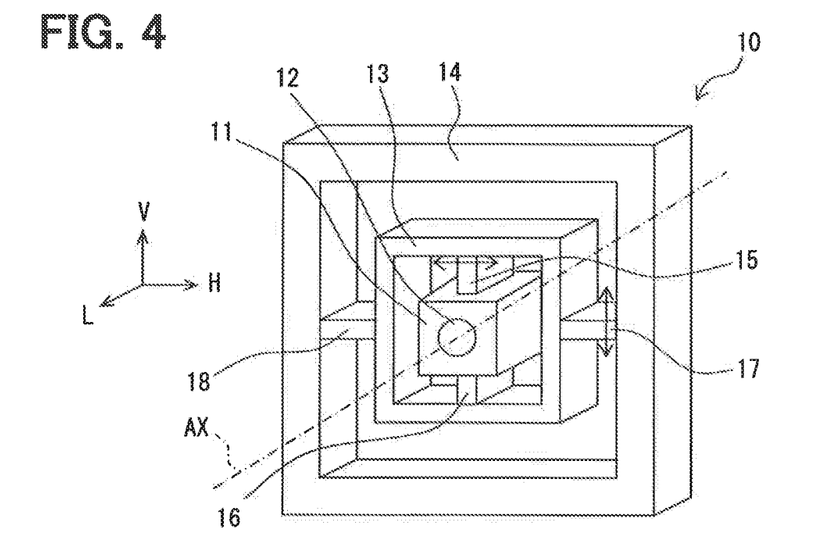
FIG. 4 is a perspective view showing a damper device of the first embodiment.

FIG. 4 is a perspective view showing the damper device 10 of the first embodiment. The damper device 10 includes a base portion 11, a first weight portion 13 and a second weight portion 14. The damper device 10 further includes two primary connecting members 15, 16 and two secondary connecting members 17, 18. The primary connecting members 15, 16 connect between the base portion 11 and the first weight portion 13. The secondary connecting members 17, 18 connect between the first weight portion 13 and the second weight portion 14.

The base portion 11 is a member, through which the damper device 10 is fixed to the casing 4. The base portion 11 is also referred to as a fixing portion or a mount portion. The base portion 11 is formed as a block configured into a shape of quadrangular prism. The base portion 11 is positioned along the central axis AX of the electric compressor 1. One of two opposed end surfaces of the base portion 11, which are opposed to each other in the direction of the central axis AX, forms a fixing surface that is urged against and is fixed to the casing 4. The base portion 11 has an outer peripheral surface, which faces radially outward. The base portion 11 has a through-hole 12, which extends through the base portion 11 in the direction of the central axis AX and through which the bolt 20 is received. The through-hole 12 is located in the center of the base portion 11. When the damper device 10 is installed to the electric compressor 1, the through-hole 12 is placed to extend along the central axis AX.

The first weight portion 13 is configured into a polygonal ring form (configured into a closed loop having a polygonal shape in the axial view). The first weight portion 13 is configured into a polygonal tubular form. The first weight portion 13 is configured into a quadrangular tubular form. The first weight portion 13 is located radially outward of the base portion 11. The first weight portion 13 is positioned to surround the outer peripheral surface of the base portion 11. In other words, the base portion 11 and the first weight portion 13 are coaxial with the central axis AX. Furthermore, the base portion 11 and the first weight portion 13 at least partially overlap with each other in the radial direction. A material of the first weight portion 13 is selected and is set to have a required weight, which is required to implement its function of suppressing the oscillations.

The second weight portion 14 is configured into a polygonal ring form (configured into a closed loop having a polygonal shape in the axial view). The second weight portion 14 is configured into a polygonal tubular form. The second weight portion 14 is configured into a quadrangular tubular form. The second weight portion 14 is located radially outward of the base portion 11. The second weight portion 14 is positioned to surround the outer peripheral surface of the base portion 11. In other words, the base portion 11 and the second weight portion 14 are coaxial with the central axis AX. Furthermore, the base portion 11 and the second weight portion 14 at least partially overlap with each other in the radial direction.

Furthermore, the second weight portion 14 is positioned radially outward of the first weight portion 13. The second weight portion 14 is positioned to surround the outer peripheral surface of the first weight portion 13. In other words, the first weight portion 13 and the second weight portion 14 are coaxial with the central axis AX. Furthermore, the first weight portion 13 and the second weight portion 14 at least partially overlap with each other in the radial direction. A material of the second weight portion 14 is selected and is set to have a required weight, which is required to implement its function of suppressing the oscillations.

The base portion 11, the first weight portion 13 and the second weight portion 14 are coaxial with the central axis AX. Furthermore, the base portion 11, the first weight portion 13 and the second weight portion 14 are overlapped with each other in the radial direction. The base portion 11 slightly projects from the first weight portion 13 and the second weight portion 14 in the axial direction. Thereby, the base portion 11 contacts the casing 4 and is fixed to the casing 4. In contrast, the first weight portion 13 and the second weight portion 14 does not directly contact the casing 4 and are indirectly supported by the casing 4 through the base portion 11 and the primary and second connecting members 15-18.

The primary connecting members 15, 16 partially connect between the base portion 11 and the first weight portion 13. The primary connecting members 15, 16 extend in the radial direction relative to the central axis AX, i.e., extend only in the direction of the axis V, so that the primary connecting members 15, 16 form primary bridge portions, respectively, which connect between the base portion 11 and the first weight portion 13. The primary connecting members 15, 16 are arranged only at corresponding locations, which are point symmetry about the central axis AX. The primary connecting members 15, 16 connect between the base portion 11 and the first weight portion 13 such that the first weight portion 13 can oscillate relative to the base portion 11. The primary connecting members 15, 16 are formed such that the primary connecting members 15, 16 are easily resiliently deformable (i.e., are more resiliently deformable) in a first oscillation direction that is perpendicular to the central axis AX. The primary connecting members 15, 16 are formed such that the primary connecting members 15, 16 are not easily resiliently deformable (i.e., are less resiliently deformable) in other directions, which are other than the above oscillation direction (the first oscillation direction). In the case of FIG. 4, the primary connecting members 15, 16 are formed such that the primary connecting members 15, 16 are easily deformed to bend in the direction of the axis H. The primary connecting members 15, 16 are formed such that the primary connecting members 15, 16 are not easily deformed in the direction of the axis V and the direction of the axis L. The primary connecting members 15, 16 are formed such that the primary connecting members 15, 16 are easily selectively flexed (deformed) by bending only in the direction of the axis H. The primary connecting members 15, 16 are formed in a plate form that extends in a plane that is parallel to the axis V and the axis L. A cross section of each of the primary connecting members 15, 16, which is taken in a plane that is parallel to the axis H and the axis L, is an elongated rectangle (oblong rectangle) that is elongated in the direction of the axis L. The primary connecting members 15, 16 are made of the material, which is not easily compressed and expanded in the direction of the axis V.

The secondary connecting members 17, 18 partially connect between the first weight portion 13 and the second weight portion 14. The secondary connecting members 17, 18 extend in the radial direction relative to the central axis AX, i.e., extend in the direction of the axis H, so that the secondary connecting members 17, 18 form secondary bridge portions, respectively, which connect between the first weight portion 13 and the second weight portion 14. The secondary connecting members 17, 18 are arranged only at corresponding locations, which are point symmetry about the central axis AX. The locations, at which the primary connecting members 15, 16 are provided, are different from the locations, at which the secondary connecting members 17, 18 are provided. The locations, at which the primary connecting members 15, 16 are provided, are displaced by 90 degrees from the locations, at which the secondary connecting members 17, 18 are provided, about the central axis AX. The secondary connecting members 17, 18 connect the second weight portion 14 to the first weight portion 13 such that the second weight portion 14 can be oscillated relative to the first weight portion 13. The secondary connecting members 17, 18 are formed such that the secondary connecting members 17, 18 are easily resiliently deformable (i.e., are more resiliently deformable) in a second oscillation direction that is perpendicular to the central axis AX. The second oscillation direction is different from the first oscillation direction. The second oscillation direction is perpendicular to the first oscillation direction. The secondary connecting members 17, 18 are formed such that the secondary connecting members 17, 18 are not easily resiliently deformable (i.e., are less resiliently deformable) in other directions, which are other than the above oscillation direction (the second oscillation direction). In the case of FIG. 4, the secondary connecting members 17, 18 are formed such that the secondary connecting members 17, 18 are easily deformed to bend in the direction of the axis V. The secondary connecting members 17, 18 are formed such that the secondary connecting members 17, 18 are not easily deformed in the direction of the axis H and the direction of the axis L. The secondary connecting members 17, 18 are formed such that the secondary connecting members 17, 18 are easily selectively flexed by bending only in the direction of the axis V. The secondary connecting members 17, 18 are formed in a plate form that extends in a plane that is parallel to the axis H and the axis L. A cross section of each of the secondary connecting members 17, 18, which is taken in a plane that is parallel to the axis V and the axis L, is an elongated rectangle (oblong rectangle) that is elongated in the direction of the axis L. The secondary connecting members 17, 18 are made of the material, which is not easily compressed and expanded in the direction of the axis V.

The primary and secondary connecting members 15-18 are resiliently deformable members. The primary and secondary connecting members 15-18 are made of rubber. In place of the rubber, synthetic resin or metal (e.g., spring steel) can be used as the material of the primary and secondary connecting members 15-18. The primary and secondary connecting members 15-18 are constructed such that the direction of the resilient deformation is limited. The primary and secondary connecting members 15-18 can be viewed as the springs. The characteristics of the primary and secondary connecting members 15-18 can be evaluated by a spring constant $k_L$ in the direction of the axis L, a spring constant $k_H$ in the direction of the axis H and a spring constant $k_V$ in the direction of the axis V.

The spring constant $k_H$ of the primary connecting members 15, 16 is sufficiently smaller than the spring constant $k_L$ and the spring constant $k_V$ of the primary connecting members 15, 16. Therefore, the material and the shape of the primary connecting members 15, 16 are set to satisfy the relationships of $k_L \gg k_H$ and $k_V \gg k_H$. The spring constant $k_L$ of the primary connecting members 15, 16 and the spring constant $k_V$ of the primary connecting members 15, 16 are generally equal to each other and can be set to meet various needs within a range that satisfies the above discussed relationships of $k_L \gg k_H$ and $k_V \gg k_H$.

The spring constant $k_V$ of the secondary connecting members 17, 18 is sufficiently smaller than the spring constant $k_L$ and the spring constant $k_H$ of the secondary connecting members 17, 18. Therefore, the material and the shape of the secondary connecting members 17, 18 are set to satisfy the relationships of $k_L \gg k_V$ and $k_H \gg k_V$. The spring constant $k_L$ of the secondary connecting members 17, 18 and the spring constant $k_H$ of the secondary connecting members 17, 18 are generally equal to each other and can be set to meet various needs within a range that satisfies the above discussed relationships of $k_L \gg k_H$ and $k_V \gg k_H$.

The spring constant $k_H$ of the secondary connecting members 17, 18 is larger than the spring constant $k_H$ of the primary connecting members 15, 16. Therefore, with respect to the oscillation in the direction of the axis H, the first weight portion 13 and the second weight portion 14 oscillate as an inertial body in the direction of the axis H. In this case, the first weight portion 13, the second weight portion 14 and the secondary connecting members 17, 18 cooperate together to form a first inertial body. The weight of the first inertial body is W1.

The spring constant $k_V$ of the primary connecting members 15, 16 is larger than the spring constant $k_V$ of the secondary connecting members 17, 18. Therefore, with respect to the oscillation in the direction of the axis V, the first weight portion 13 and the base portion 11 oscillate in the direction of the axis V as an integral body. In contrast, the second weight portion 14 alone becomes as an inertial body and is oscillated. In such a case, the second weight portion 14 alone forms the second inertial body. The weight of the second inertial body is W2.

The first inertial body, which is formed by the first weight portion 13 and the second weight portion 14, and the second inertial body, which is formed by the second weight portion 14, are coaxially arranged such that the first inertial body and the second inertial body overlap with each other in the radial direction. With this arrangement, there is provided the damper device 10, which has the small size in the axial direction. The first inertial body and the second inertial body are arranged to surround the central axis AX. In this way, the inertial bodies are spread around the central axis. Therefore, there is provided the damper device 10, which can be received in an annular chamber that is defined in the inside of the electric compressor 1.

The base portion 11, the first inertial body, the second inertial body, the primary connecting members 15, 16 and the secondary connecting members 17, 18 are centered on a central axis, which coincides with the central axis AX of the electric compressor 1. Therefore, there is provided the damper device 10, which can be easily installed in the annular chamber defined in the inside of the electric compressor 1.

The first weight portion 13 and the second weight portion 14 selectively function as the inertial body with respect to the oscillation acceleration acting on the base portion 11 in the one direction perpendicular to the central axis AX, i.e., in the direction of the axis H. Furthermore, the second weight portion 14 selectively functions as the inertial body with respect to the oscillation acceleration acting on the base portion 11 in the other direction perpendicular to the central axis AX, i.e., in the direction of the axis V. A fixation direction of the electric compressor 1, which is fixed by the fixing portions 4f and the bolts 4g, coincides with one of the oscillation directions of the damper device 10. Specifically, the fixation direction of the electric compressor 1, which is fixed by the fixing portions 4f and the bolts 4g, coincides with the direction of the axis H or the direction of the axis V. In other words, a longitudinal direction of each bolt 4g coincides with the possible oscillation direction of the first weight portion 13 or the possible oscillation direction of the second weight portion 14. The first weight portion 13 and the second weight portion 14 function as the inertial body for the oscillation acceleration applied to the base portion 11 in the rotational direction about the central axis AX.

Figure 5:
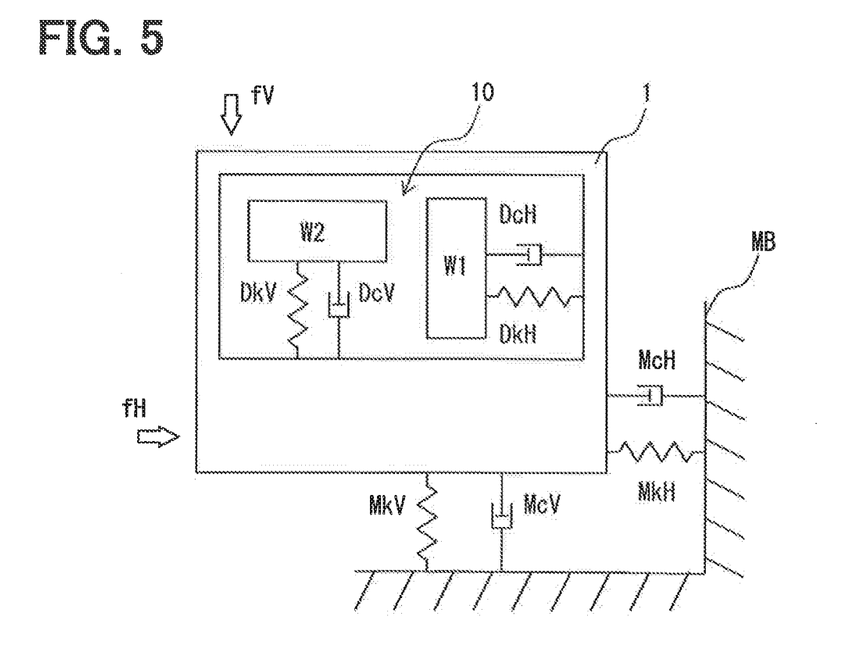
FIG. 5 is a block diagram showing an oscillation model of the electric compressor of the first embodiment.

FIG. 5 shows an oscillation model of the electric compressor 1. The electric compressor 1 is fixed to a mount member MB. The mount member MB is the vehicle body or the engine. In FIG. 5, the oscillation fH in the direction of the axis H and the oscillation fV in the direction of the axis V are shown. The electric compressor 1 is supported by the mount member MB by spring components MkH, MKv and damper components McH, McV. The damper device 10 has the first inertial body mass W1 and the second inertial body mass W2.

The first inertial body mass W2 is supported by the electric compressor 1 through the spring component DkV and the damper component DcV. The spring component DkV is provided by the secondary connecting members 17, 18. The first inertial body mass W1 is supported by the electric compressor 1 through the spring component DkH and the damper component DcH. The spring component DkH is provided by the secondary connecting members 17, 18.

A resonance frequency of the damper device 10 with respect to the oscillation fH can be expressed by $\frac{1}{2}\pi \times (DkH/W1)^{1/2}$. A resonance frequency of the damper device 10 with respect to the oscillation fV can be expressed by $\frac{1}{2}\pi \times (DkV/W2)^{1/2}$.

With the above construction, the first inertial body is provided by the first weight portion 13 and the second weight portion 14. The second inertial body is provided by the second weight portion 14. The primary connecting members 15, 16 enable the oscillation of the first inertial body, which includes the first weight portion 13, along mainly the axis H. When the first inertial body selectively oscillates along the axis H, the oscillation of the electric compressor 1 in the direction of the axis H is limited. The secondary connecting members 17, 18 enable the oscillation of the second inertial body, which includes the second weight portion 14, along mainly the axis V. When the second inertial body selectively oscillates along the axis V, the oscillation of the electric compressor 1 in the direction of the axis V is limited. The axis H and the axis V are two axes that are perpendicular to the central axis AX of the electric compressor 1. Thereby, there is provided the damper device 10, which limits the oscillations in all of the directions in the plane, which is perpendicular to the central axis AX of the electric compressor 1.

Figure 6:
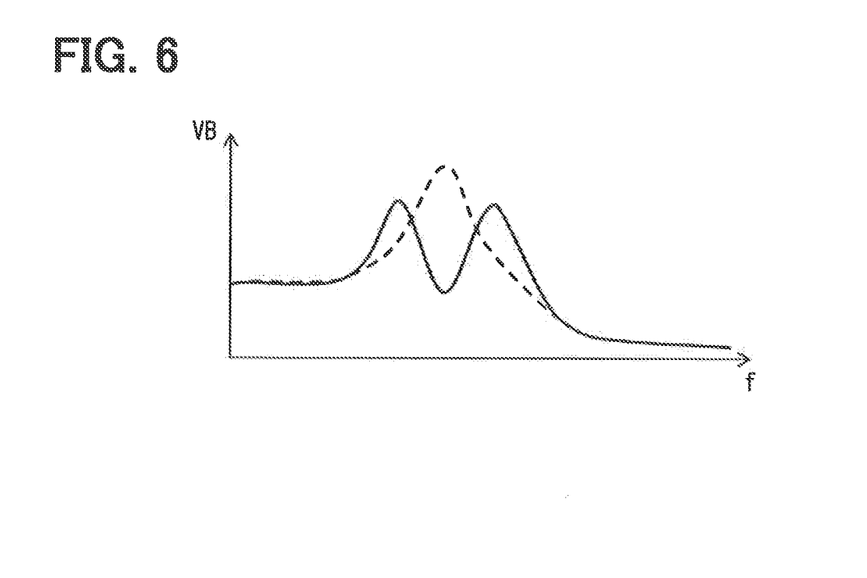
FIG. 6 is diagram showing frequency characteristics of oscillations of the electric compressor of the first embodiment.

FIG. 6 shows frequency characteristics of the electric compressor 1. In FIG. 6, an axis of abscissas indicates the frequency f of the oscillation. Furthermore, an axis of ordinates indicates the oscillation (amplitude) VB of the electric compressor 1. In FIG. 6, a dotted line indicates a comparative case where the damper device 10 is not provided. Furthermore, a solid line indicates the first embodiment, in which the damper device 10 is provided. According to the present embodiment, the oscillations of the electric compressor 1 are effectively limited.

According to the present embodiment, the damper device 10 includes the base portion 11, which is fixed to the casing 4. The damper device 10 includes the first inertial body (i.e., the first and second weight portions 13, 14), which is movable relative to the base portion 11, and the second inertial body (i.e., the second weight portion 14), which is movable relative to the base portion 11. Furthermore, the damper device 10 includes the primary connecting members 15, 16, which connect between the base portion 11 and the first inertial body to enable the oscillation of the first inertial body in the one direction (the direction of the axis H) that is perpendicular to the central axis AX. Furthermore, the damper device 10 includes the secondary connecting members 17, 18, which connect between the base portion 11 and the second inertial body to enable the oscillation of the second inertial body in the other direction (the direction of the axis V) that is perpendicular to the central axis AX. The first inertial body, which includes the first weight portion 13 and the second weight portion 14, is connected to the base portion 11 by the primary connecting members 15, 16. Furthermore, the first inertial body is connected such that the first inertial body is selectively oscillatable in the one direction, which is perpendicular to the central axis AX. The second inertial body, which includes only the second weight portion 14, is indirectly connected to the base portion 11 through the secondary connecting members 17, 18. Furthermore, the second inertial body is connected such that the second inertial body is selectively oscillatable in the other direction, which is perpendicular to the central axis AX. Thus, the two inertial bodies, i.e., the first inertial body and the second inertial body are oscillatable in the two different directions, respectively. Thereby, the oscillations in the two directions, which are perpendicular to the central axis AX, can be limited by these two inertial bodies. As a result, it is possible to limit the oscillations (vibrations) in the multiple directions. Thus, the damper device 10, which has the improved installability, is provided.

(Second Embodiment)

Figure 7:
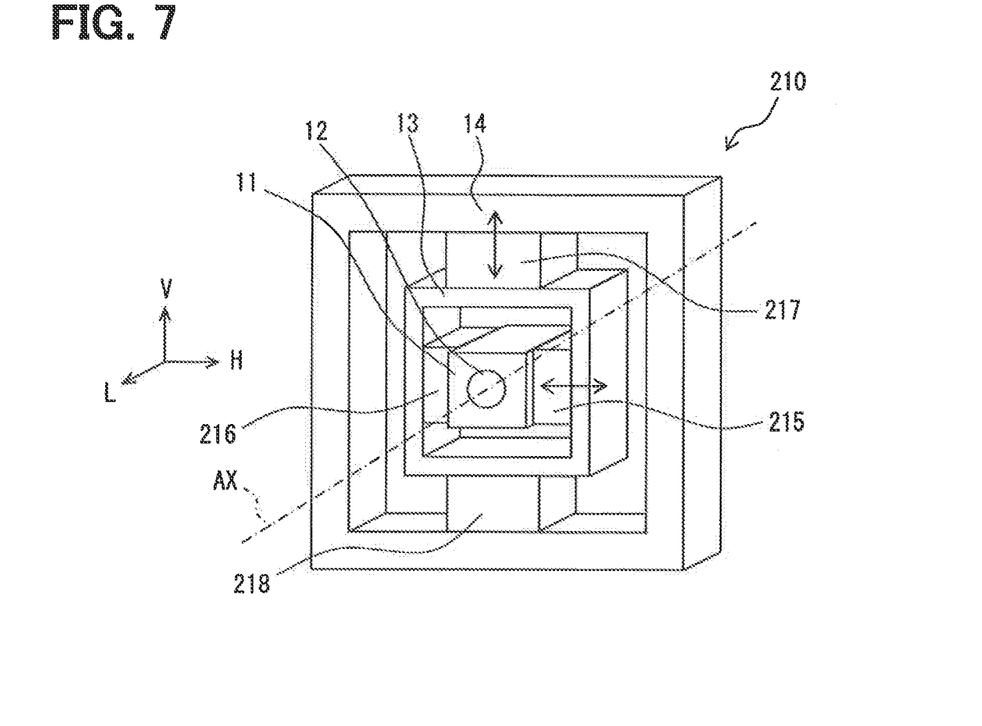
FIG. 7 is a perspective view of a damper device according to a second embodiment of the present disclosure.

FIG. 7 is a perspective view showing a damper device 210 according to a second embodiment of the present disclosure. In the above embodiment, the primary and secondary connecting members 15-18 selectively permit the oscillations of each corresponding inertial body by the bending deflection thereof. Alternatively, in the present embodiment, the oscillations of each corresponding inertial body are selectively enabled by compressive and tensile deformations of primary and secondary connecting members 215, 216, 217, 218.

The primary connecting members 215, 216, which connect between the base portion 11 and the first weight 13, have a sufficient width (extent) in each of the direction of the axis V and the direction of the axis L. Therefore, the primary connecting members 215, 216 do not substantially resiliently deform in the direction of the axis V and the direction of the axis L. In contrast, the primary connecting members 215, 216 have the material and the structure, which enable the compressive and tensile deformations of the primary connecting members 215, 216 in the direction of the axis H. Therefore, the primary connecting members 215, 216 support the first inertial body, which includes the first weight portion 13 and the second weight portion 14, such that the first inertial body is selectively oscillatable only in the direction of the axis H.

The secondary connecting members 217, 218, which connect between the first weight portion 13 and the second weight portion 14, have a sufficient width (extent) in each of the direction of the axis H and the direction of the axis L. Therefore, the secondary connecting members 217, 218 do not substantially resiliently deform in the direction of the axis H and the direction of the axis L. In contrast, the secondary connecting members 217, 218 have the material and the structure, which enable the compressive and tensile deformations of the secondary connecting members 217, 218 in the direction of the axis V. Therefore, the secondary connecting members 217, 218 support the second inertial body, which includes only the second weight portion 14 (i.e., does not have the first weight portion 13), such that the second inertial body is selectively oscillatable only in the direction of the axis V.

(Third Embodiment)

Figure 8:
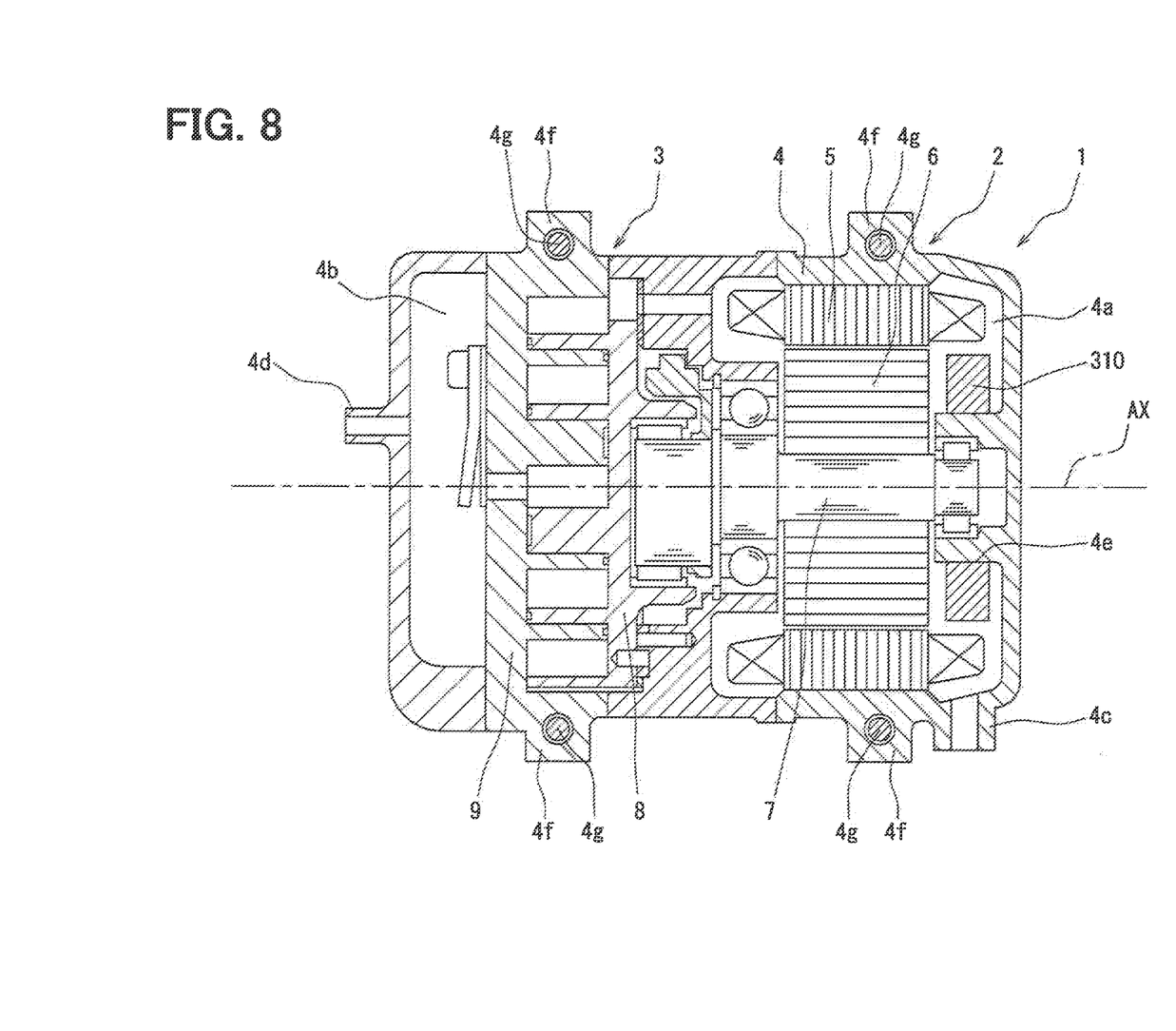
FIG. 8 is a cross-sectional view of an electric compressor according to a third embodiment of the present disclosure.

FIG. 8 is a longitudinal cross-sectional view of the electric compressor 1 according to the third embodiment of the present disclosure. In the first and second embodiments, the damper device 10 is received in the discharge chamber 4b. Alternatively, in the third embodiment, a damper device 310 is received in the motor chamber 4a. The motor chamber 4a is communicated with the suction port 4c and is thereby also referred to as a suction chamber. In the refrigeration cycle, the low temperature refrigerant, which has the relatively low temperature, is supplied to the suction port 4c. Therefore, the motor chamber 4a is a portion, which has the relatively low temperature in the electric compressor 1. When the damper device 310 is received in the motor chamber 4a, the durability of the damper device 310 against the heat can be improved.

Figure 9:
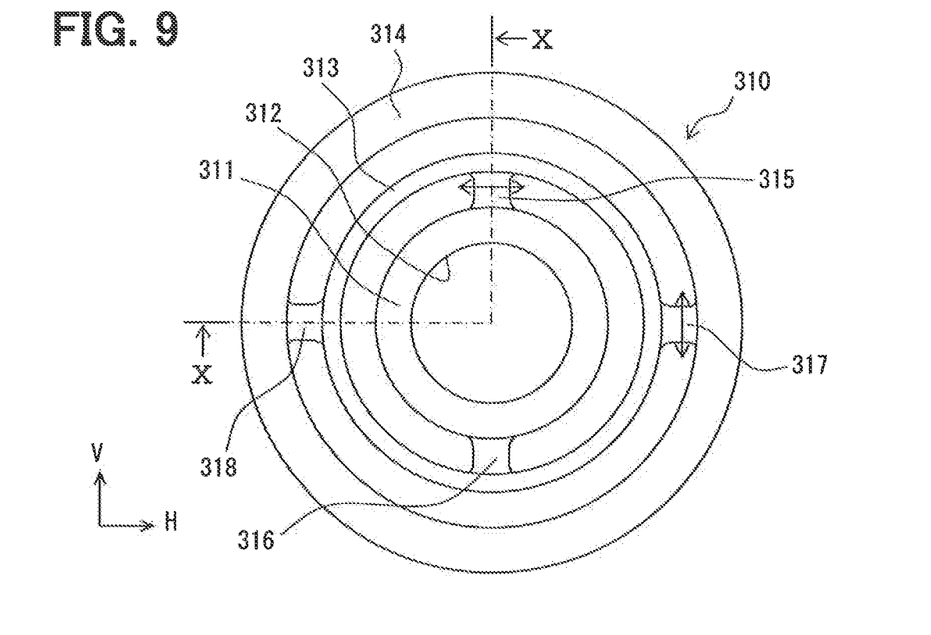
FIG. 9 is a front view of a damper device according to the third embodiment of the present disclosure.
Figure 10:
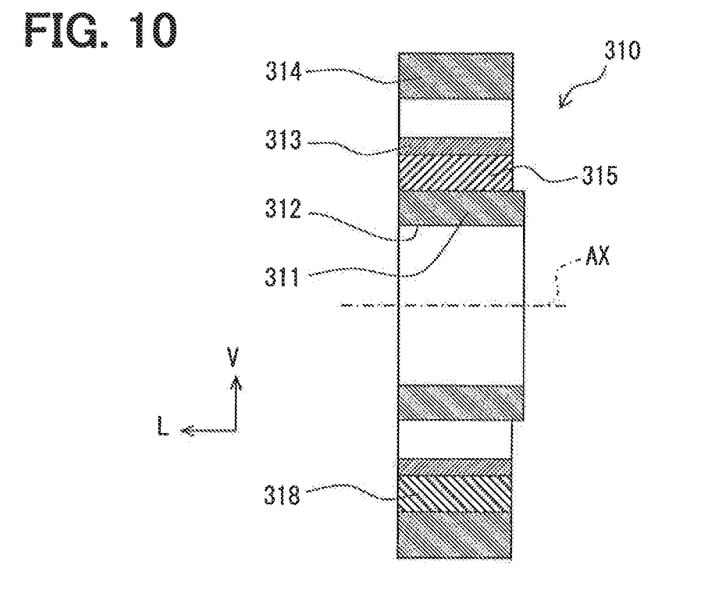
FIG. 10 is a cross-sectional view of the damper device of the third embodiment taken along line-X-X in FIG. 9.

FIG. 9 is a front view of the damper device 310 seen in the direction of the central axis AX. FIG. 10 is a cross sectional view taken along line X-X in FIG. 9, showing connecting members 315, 318 of the damper device 310. Each of a base portion 311, a first weight portion 313 and a second weight portion 314 is configured into a corresponding cylindrical form (configured into a closed loop having a circular shape in the axial view). The base portion 311 has a relatively large through-hole 312, which is larger than an outer diameter of the boss portion 4e of the casing 4 and extends through the base portion 311 in the direction of the central axis AX. The boss portion 4e is press fitted into the through-hole 312 of the base portion 311, so that the damper device 310 is supported in the motor chamber 4a. The primary connecting members 315, 316 connect between the base portion 311 and the first weight portion 313. The secondary connecting members 317, 318 connect between the first weight portion 313 and the second weight portion 314. At least one (in this instance, only one) of two axial ends of the base portion 311 is positioned such that the at least one of the two axial ends of the base portion 311 projects from the first weight portion 313 and the second weight portion 314 in the direction of the axis AX. This projecting end of the base portion 311 is urged against the casing 4 and positions the first weight portion 313 and the second weight portion 314 away from the casing 4.

(Fourth Embodiment)

Figure 11:
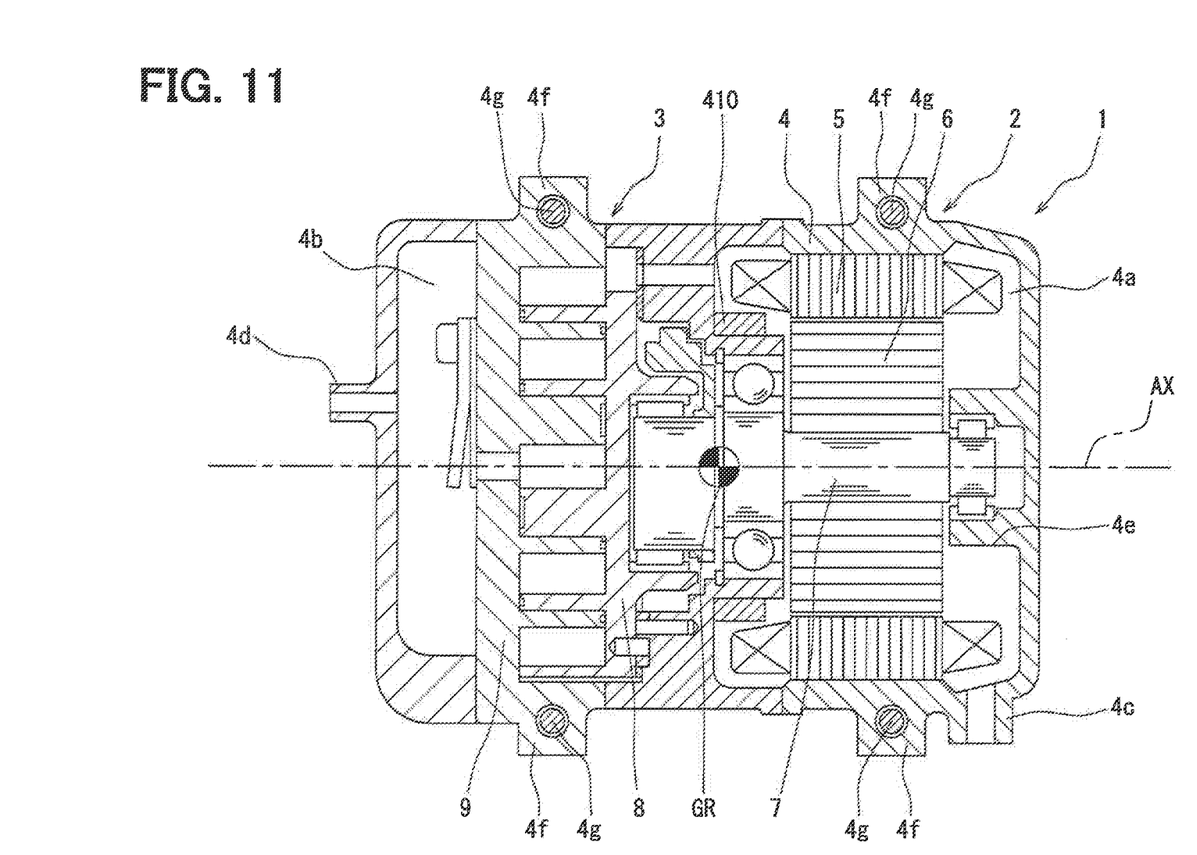
FIG. 11 is a longitudinal cross-sectional view of an electric compressor according to a fourth embodiment of the present disclosure.

FIG. 11 is a longitudinal cross-sectional view of the electric compressor 1 according to a fourth embodiment of the present disclosure. In the first to third embodiments, the damper device 10, 310 is positioned in the end portion of the electric compressor 1. Alternatively, in the fourth embodiment, a damper device 410 is positioned in a generally center portion of the electric compressor 1. The damper device 410 is received in the inside of the motor chamber 4a. The damper device 410 is placed radially outward of the center of gravity GR. The center of gravity GR is a center of gravity with respect to the direction of the central axis AX and the radial direction of the electric compressor 1.

Figure 12:
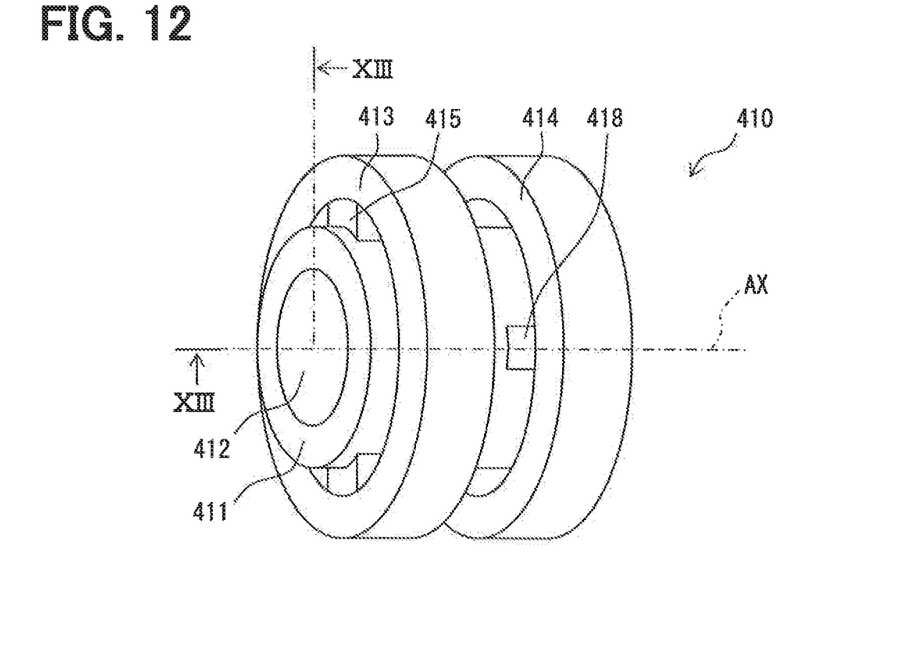
FIG. 12 is a perspective view of a damper device according to the fourth embodiment.

FIG. 12 is a perspective view of the damper device 410. In the above embodiments, the damper device 10 includes the multiple weight portions 13, 14, which are coaxially arranged and are overlapped with each other in the radial direction. Alternatively, in the fourth embodiment, the damper device 410 includes a plurality of weight portions (first and second weight portions) 413, 414, which are coaxially arranged and are overlapped with each other in the direction of the central axis AX. With this arrangement, there is provided the damper device 410, which has the small size, i.e., the reduced size in the radial direction.

Figure 13:
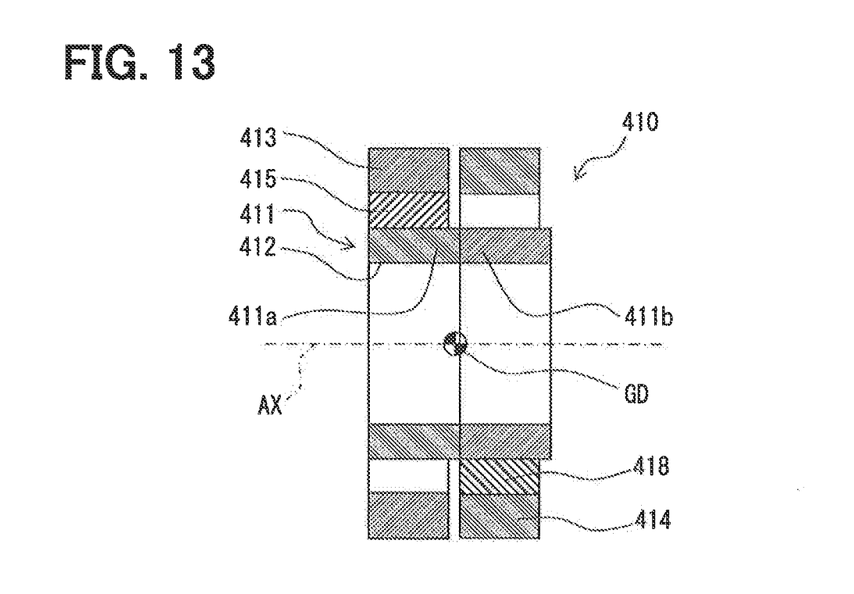
FIG. 13 is a cross-sectional view of the damper device of the fourth embodiment taken along line XIII-XIII in FIG. 12.

FIG. 13 is a cross sectional view showing connecting members 415, 418 of the damper device 410. Each of a base portion 411, the first weight portion 413 and the second weight portion 414 is configured into a corresponding cylindrical form (configured into a closed loop having a circular shape in the axial view). The base portion 411 has a through-hole 412, which extends through the base portion 411 in the direction of the central axis AX. The base portion 411 is fixed to the inner surface of the casing 4, so that the damper device 410 is supported in the motor chamber 4a. The base portion 411 includes a first section 411a and a second section 411b, which are joined with each other in the direction of the central axis AX. The first section 411a and the second section 411b are axially joined together. The first section 411a forms a section of the base portion 411, to which the first weight portion 413 is connected. The second section 411b forms another section of the base portion 411, to which the second weight portion 414 is connected. The first weight portion 413 and the second weight portion 414 are serially arranged in the direction (longitudinal direction) of the central axis AX, i.e., are arranged one after another in the direction of the central axis AX. The primary connecting members 415, 416 connect between the base portion 411 and the first weight portion 413. The secondary connecting members 417, 418 connect between the base portion 411 and the second weight portion 414. In the present embodiment, the first weight portion 413 alone forms a first inertial body. Furthermore, the second weight portion 414 alone forms a second inertial body.

The damper device 410 is arranged such that a center GD of the damper device 410 and the center of gravity GR of the electric compressor 1 coincide with each other. The center GD of the damper device 410 is located in a plane, which is perpendicular to the central axis AX, such that the center GD of the damper device 410 corresponds to a center of oscillation of the first inertial body and the second inertial body enabled by the primary and secondary connecting members 415-418. Thereby, the damping effect can be advantageously achieved.

The embodiments of the present disclosure have been described. However, the present disclosure is not limited to the above embodiments. The above embodiments may be modified in various ways without departing from the spirit and scope of the present disclosure. The structures of the above embodiments are mere examples, and the scope of the present disclosure is not limited to them. The scope of the present disclosure should cover modifications, which are equivalent to those discussed in the above embodiments.

For example, the damper device of the present disclosure can be applied to various rotating machines, such as electric motors, electric power generators, compressors driven by the engine or pumps.

The connecting members may be made of a resin material, which has high rigidity or a metal material, such as a damping alloy, which has high damping performance.

In the first to fourth embodiments, the first weight portion and the second weight portion are placed radially outward of the base portion. Alternatively, the first weight portion and the second weight portion may be placed radially inward of the base portion. For example, among a plurality of tubes (tubular weight portions), a second one or a radially outermost one of the tubes may be used as the base portion.

In the above embodiments, the one base portion and the two weight portions are made of cylindrical or quadrangular tubes, respectively. Alternatively, polygonal tubes (e.g., triangular tubes or tubes with five or a greater number of sides, i.e., other polygonal form) may be used to form the base portion and the two weight portions, respectively. Furthermore, the base portion and the weight portions may have any other shape, such as a C-shape or U-shape which are other than the polygon.

In the above embodiments, the material of the weight portions is different from the material of the connecting members, and these separate members are integrally assembled to form the damper device, Alternatively, the weight portions and the connecting members may be formed integrally. For example, the weight portions and the connecting members may be integrally molded with a common material (continuous single material), and the weight portions and the connecting members may be configured into corresponding different shapes to implement the required rigidities and resiliencies.

Additional advantages and modifications will readily occur to those skilled in the art. The present disclosure in its broader terms is therefore not limited to the specific details, representative apparatus, and illustrative examples shown and described.

What is claimed is:

1. A damper device for a rotating machine, which includes a rotatable arrangement that is rotatable about a central axis, the damper device comprising:
a base portion that is configured to be fixed to a casing of the rotating machine;
a first weight portion that is movable relative to the base portion;
a second weight portion that is movable relative to the base portion;
at least one primary connecting member that is at least partially placed within an axial extent of the base portion and an axial extent of the first weight portion in a direction of the central axis to radially connect between the base portion and the first weight portion at an axial location that is within the axial extent of the base portion and the axial extent of the first weight portion, wherein the at least one primary connecting member enables oscillation of the first weight portion in a first direction that is perpendicular to the central axis; and
at least one secondary connecting member that is at least partially placed within the axial extent of the first weight portion and an axial extent of the second weight portion in the direction of the central axis to radially connect between the first weight portion and the second weight portion at an axial location that is within the axial extent of the first weight portion and the axial extent of the second weight portion, wherein the at least one secondary connecting member enables oscillation of the second weight portion in a second direction that is perpendicular to the central axis and is different from the first direction,
wherein
the at least one primary connecting member is formed discontinuously from the at least one secondary connecting member,
the at least one primary connecting member is indirectly connected to the at least one secondary connecting member through one of the first weight portion and the base portion,
the at least one primary connecting member is formed separately from the first weight portion and is secured to the first weight portion,
the base portion, the first weight portion and the second weight portion are formed separately from each other,
the at least one primary connecting member and the at least one secondary connecting member are made of one of rubber and synthetic resin, which are resiliently deformable,
a spring constant of the at least one secondary connecting member, which is measured in the first direction, is larger than a spring constant of the at least one primary connecting member, which is measured in the first direction, and
a spring constant of the at least one primary connecting member, which is measured in the second direction, is larger than a spring constant of the at least one secondary connecting member, which is measured in the second direction.

2. The damper device according to claim 1, wherein the first direction and the second direction are perpendicular to each other about the central axis.

3. The damper device according to claim 2, wherein the base portion, the first weight portion, the second weight portion, the at least one primary connecting member and the at least one secondary connecting member are placed in an inside of the casing.

4. The damper device according to claim 3, wherein the first weight portion and the second weight portion surround the central axis.

5. The damper device according to claim 4, wherein the first weight portion and the second weight portion are respectively configured into closed loops that have a circular shape or a polygonal shape in an axial view taken in a direction of the central axis.

6. The damper device according to claim 5, wherein the first weight portion and the second weight portion overlap with each other in a radial direction.

7. The damper device according to claim 5, wherein the first weight portion and the second weight portion overlap with each other in a direction of the central axis.

8. The damper device according to claim 1, wherein the base portion, the first weight portion, the second weight portion, the at least one primary connecting member and the at least one secondary connecting member are centered on a central axis, which coincides with the central axis of the rotating machine.

9. The damper device according to claim 1, wherein the base portion, the first weight portion, the second weight portion, the at least one primary connecting member and the at least one secondary connecting member are arranged such that a center of oscillation of the first weight portion and the second weight portion coincides with a center of gravity of the rotating machine.

10. The damper device according to claim 1, wherein:
the rotating machine is an electric compressor;
the rotating arrangement includes:
a compressor unit that is configured to compress fluid; and
an electric motor unit that is configured to drive the compressor unit; and
the compressor unit and the electric motor unit are received in the casing.

11. The damper device according to claim 1, wherein:
a spring constant of the at least one primary connecting member, which is measured in the first direction, is smaller than a spring constant of the at least one primary connecting member, which is measured in the second direction; and
a spring constant of the at least one secondary connecting member, which is measured in the second direction, is smaller than a spring constant of the at least one secondary connecting member, which is measured in the first direction.

12. The damper device according to claim 1, wherein:
the at least one primary connecting member includes a plurality of primary connecting members, which are formed discontinuously from each other; and
the at least one secondary connecting member includes a plurality of secondary connecting members, which are formed discontinuously from each other.

13. The damper device according to claim 12, wherein the plurality of primary connecting members is displaced from the plurality of secondary connecting members in a circumferential direction about the central axis.

14. The damper device according to claim 12, wherein:
the first direction and the second direction are perpendicular to each other;
the plurality of primary connecting members includes a first primary connecting member and a second primary connecting member, which are opposed to each other and extend in the second direction; and
the plurality of secondary connecting members includes a first secondary connecting member and a second secondary connecting member, which are opposed to each other and extend in the first direction.

15. The damper device according to claim 1, wherein:

the first direction and the second direction are perpendicular to each other;

the at least one primary connecting member includes a first primary connecting member and a second primary connecting member, which are opposed to each other and extend in the second direction;

the base portion and the first weight portion are connected with each other only through the first primary connecting member and the second primary connecting member;

the at least one secondary connecting member includes a first secondary connecting member and a second secondary connecting member, which are opposed to each other and extend in the first direction; and the first weight portion and the second weight portion are connected with each other only through the first secondary connecting member and the second secondary connecting member.

\* \* \* \* \*